(12) United States Patent
Wong et al.

(10) Patent No.: US 9,740,842 B1
(45) Date of Patent: *Aug. 22, 2017

(54) WEARABLE COMPUTING DEVICE AUTHENTICATION USING BONE CONDUCTION

(71) Applicant: Google Inc., Mountain View, CA (US)

(72) Inventors: Adrian Wong, Austin, TX (US); Thad Eugene Starner, Mountain View, CA (US); Joshua Weaver, San Jose, CA (US)

(73) Assignee: Google Inc., Mountain View, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 14/976,353

(22) Filed: Dec. 21, 2015

Related U.S. Application Data

(63) Continuation of application No. 13/425,821, filed on Mar. 21, 2012, now Pat. No. 9,277,334.

(51) Int. Cl.
*G06F 7/04* (2006.01)
*G06F 12/00* (2006.01)
(Continued)

(52) U.S. Cl.
CPC ........... *G06F 21/32* (2013.01); *H04R 29/001* (2013.01)

(58) Field of Classification Search
CPC .............. H04R 2460/13; H04R 25/606; H04R 1/1041; H04R 2499/11; H04R 29/001; G06F 21/32
(Continued)

(56) References Cited

U.S. PATENT DOCUMENTS 2,291,942 A    8/1942   Bagno
2,858,376 A    10/1958   Lewis
(Continued)

FOREIGN PATENT DOCUMENTS

CN     1894796 A    1/2007
CN     101393325 A    3/2009
(Continued)

OTHER PUBLICATIONS

Notification of First Office Action for Chinese Patent Application No. 201380026267.1 dated Mar. 3, 2016.
(Continued)

*Primary Examiner* — Paul S Kim
(74) *Attorney, Agent, or Firm* — Lerner, David, Littenberg, Krumholz & Mentlik, LLP

(57) ABSTRACT

A wearable computing device is authenticated using bone conduction. When a user wears the device, a bone conduction speaker and a bone conduction microphone on the device contact the user's head at positions proximate the user's skull. A calibration process is performed by transmitting a signal from the speaker through the skull and receiving a calibration signal at the microphone. An authentication process is subsequently performed by transmitting another signal from the speaker through the skull and an authentication signal is received at the microphone. In the event that frequency response characteristics of the authentication signal match the frequency response characteristics of the calibration signal, the user is authenticated and the device is enabled for user interaction without requiring the user to input any additional data.

20 Claims, 7 Drawing Sheets

(51) Int. Cl.
*G06F 12/14* (2006.01)
*G06F 13/00* (2006.01)
*G06F 17/30* (2006.01)
*G11C 7/00* (2006.01)
*H04R 29/00* (2006.01)
*G06F 21/32* (2013.01)

(58) Field of Classification Search
USPC .............................................. 381/58; 726/19
See application file for complete search history.

(56) References Cited

U.S. PATENT DOCUMENTS

| | | | |
|---|---|---|---|
| 2,947,822 | A | 8/1960 | Matsuura |
| 3,014,994 | A | 12/1961 | Posen |
| 4,787,727 | A | 11/1988 | Boodman et al. |
| 4,806,011 | A | 2/1989 | Bettinger |
| 4,867,551 | A | 9/1989 | Perera |
| 4,917,479 | A | 4/1990 | Bidgood |
| D327,079 | S | 6/1992 | Allen |
| 5,175,571 | A | 12/1992 | Tanefsky et al. |
| D334,557 | S | 4/1993 | Hunter et al. |
| D337,320 | S | 7/1993 | Hunter et al. |
| D402,651 | S | 12/1998 | Depay et al. |
| 6,034,653 | A | 3/2000 | Robertson et al. |
| 6,091,546 | A | 7/2000 | Spitzer |
| D436,960 | S | 1/2001 | Budd et al. |
| 6,349,001 | B1 | 2/2002 | Spitzer |
| 6,356,392 | B1 | 3/2002 | Spitzer |
| 6,654,071 | B2 | 11/2003 | Chen |
| 6,943,755 | B1 | 9/2005 | Bartow |
| D512,985 | S | 12/2005 | Travers et al. |
| 7,158,096 | B1 | 1/2007 | Spitzer |
| D559,250 | S | 1/2008 | Pombo |
| D565,082 | S | 3/2008 | McClure et al. |
| 7,500,746 | B1 | 3/2009 | Howell et al. |
| D602,064 | S | 10/2009 | Mitsui et al. |
| 7,631,968 | B1 | 12/2009 | Dobson et al. |
| 7,648,236 | B1 | 1/2010 | Dobson |
| 7,663,805 | B2 | 2/2010 | Zaloum et al. |
| 7,675,683 | B2 | 3/2010 | Dobson et al. |
| 7,843,403 | B2 | 11/2010 | Spitzer |
| 8,000,000 | B2 | 8/2011 | Greenberg et al. |
| D646,316 | S | 10/2011 | Zhao |
| D659,739 | S | 5/2012 | Olsson et al. |
| 8,202,238 | B2 | 6/2012 | Yamazaki et al. |
| 8,259,159 | B2 | 9/2012 | Hu |
| 8,317,320 | B2 | 11/2012 | Huang |
| 8,378,924 | B2 | 2/2013 | Jacobsen et al. |
| 9,075,249 | B2 | 7/2015 | Heinrich et al. |
| 2002/0089469 | A1 | 7/2002 | Cone et al. |
| 2002/0190961 | A1 | 12/2002 | Chen |
| 2003/0090439 | A1 | 5/2003 | Spitzer et al. |
| 2005/0201574 | A1 | 9/2005 | Lenhardt |
| 2005/0219152 | A1 | 10/2005 | Budd et al. |
| 2006/0019614 | A1 | 1/2006 | Yamasaki |
| 2006/0093178 | A1 | 5/2006 | Chen |
| 2006/0165246 | A1 | 7/2006 | Lee et al. |
| 2006/0193487 | A1 | 8/2006 | Mok et al. |
| 2006/0262954 | A1 | 11/2006 | Lee et al. |
| 2007/0008484 | A1 | 1/2007 | Jannard |
| 2007/0044803 | A1 | 3/2007 | Xue et al. |
| 2008/0008344 | A1 | 1/2008 | Wakabayashi et al. |
| 2008/0291277 | A1 | 11/2008 | Jacobsen et al. |
| 2009/0201460 | A1 | 8/2009 | Blum et al. |
| 2009/0219479 | A1 | 9/2009 | Tsai |
| 2010/0045928 | A1 | 2/2010 | Levy |
| 2010/0046782 | A1 | 2/2010 | Ito et al. |
| 2010/0073262 | A1 | 3/2010 | Matsumoto |
| 2010/0079356 | A1 | 4/2010 | Hoellwarth |
| 2010/0110368 | A1 | 5/2010 | Chaum |
| 2010/0149073 | A1 | 6/2010 | Chaum et al. |
| 2010/0157433 | A1 | 6/2010 | Mukawa et al. |
| 2010/0188314 | A1 | 7/2010 | Miyake et al. |
| 2010/0328033 | A1* | 12/2010 | Kamei ................. A61B 8/0875 340/5.82 |
| 2010/0329485 | A1 | 12/2010 | Fukuda |
| 2011/0012814 | A1 | 1/2011 | Tanaka |
| 2011/0115703 | A1 | 5/2011 | Iba et al. |
| 2011/0187990 | A1 | 8/2011 | Howell et al. |
| 2011/0213664 | A1 | 9/2011 | Osterhout et al. |
| 2011/0224481 | A1 | 9/2011 | Lee et al. |
| 2011/0248905 | A1 | 10/2011 | Chosokabe et al. |
| 2011/0279769 | A1 | 11/2011 | Rhee |
| 2012/0002158 | A1 | 1/2012 | Jirsa et al. |
| 2012/0062806 | A1 | 3/2012 | Sugiyama |
| 2012/0081658 | A1 | 4/2012 | Sugihara et al. |
| 2013/0188080 | A1 | 7/2013 | Olsson et al. |
| 2013/0214998 | A1 | 8/2013 | Andes et al. |
| 2013/0235331 | A1 | 9/2013 | Heinrich et al. |

FOREIGN PATENT DOCUMENTS

| | | |
|---|---|---|
| CN | 101632033 | 1/2010 |
| CN | 101978704 A | 2/2011 |
| CN | 102445768 A | 5/2012 |
| DE | 102009014327 A1 | 9/2010 |
| DE | 202012003317 U1 | 7/2012 |
| EP | 0899599 A2 | 3/1999 |
| EP | 1233616 A1 | 8/2002 |
| JP | 2007243649 A | 9/2007 |
| JP | 2009237450 A | 10/2009 |
| JP | 2012216123 A | 11/2012 |
| KR | 20010060284 A | 7/2001 |
| KR | 20020088226 A | 11/2002 |
| KR | 20060001786 A | 1/2006 |
| KR | 20070049195 A | 5/2007 |
| KR | 20120001964 U | 3/2012 |
| TW | 579019 U | 3/2004 |
| TW | M335691 U | 7/2008 |
| WO | 0055676 A1 | 9/2000 |
| WO | 2005096664 A1 | 10/2005 |
| WO | 2007082430 A1 | 7/2007 |
| WO | 2010092904 A1 | 8/2010 |

OTHER PUBLICATIONS

Office Action for Taiwanese Patent Application No. 102110013, dated Aug. 30, 2016.
Examination Report for European Patent Application No. 13764245.0, dated Jan. 31, 2017.
International Search Report & Written Opinion for Application No. PCT/US2012/050690 dated Feb. 28, 2013.
International Search Report and Written Opinion dated Apr. 25, 2013 for Application No. PCT/US2013/020114.
International Search Report & Written Opinion for Application No. PCT/US2013/033293 dated Jun. 28, 2013.
Google Translation of DE 10200901432 A1.
International Search Report and Written Opinion for Application No. PCT/US2014/015056 dated May 22, 2014.
Taiwanese Office Action for Application No. 102100130 dated Oct. 2, 2014.
International Preliminary Report on Patentability for Application No. PCT/US2013/033293 dated Sep. 23, 2014.
Extended European Search Report for Application No. 13764245.0 dated Sep. 11, 2015.
Examination Report dated Jun. 27, 2016, for European Patent Application No. 13764245.0.
Notice of Reasons for Rejection dated Jun. 29, 2016, for Japanese Patent Application No. 2015-501912.
Notification of the Second Office Action dated Jul. 15, 2016, for Chinese Patent Application No. 201380011278.2.
Extended European Search Report dated Aug. 17, 2016, for European Patent Application No. 14748592.4. 10 pages.
Notification of the Second Office Action dated Aug. 23, 2016, for Chinese Patent Application No. 201380026267.1.

(56) References Cited

OTHER PUBLICATIONS

Notification of the First Office Action for Chinese Patent Application No. 201480007744.4, dated Sep. 18, 2016.

\* cited by examiner

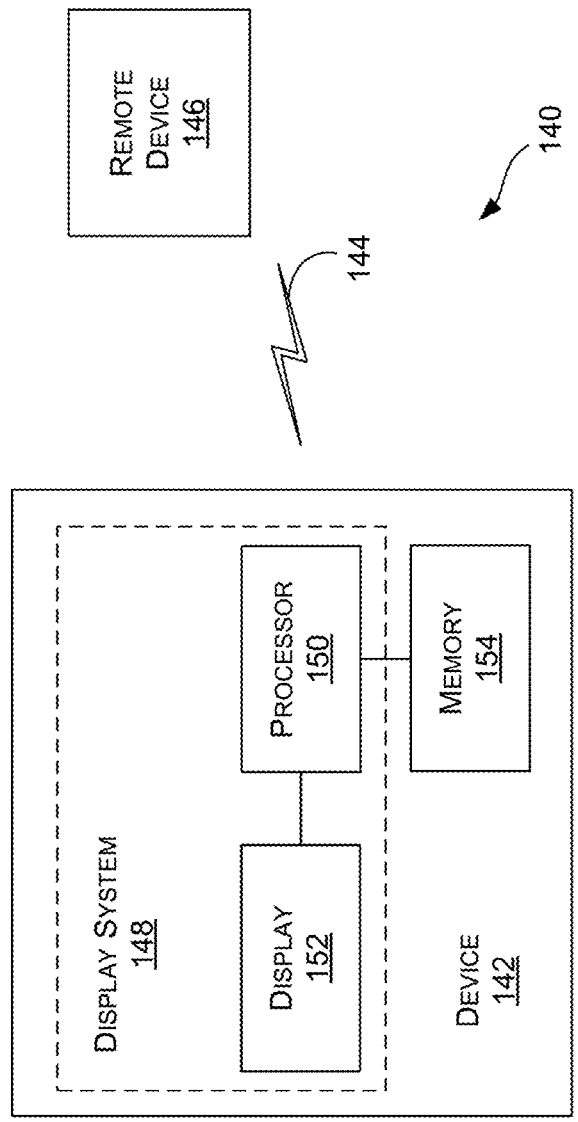

WEARABLE COMPUTING DEVICE AUTHENTICATION USING BONE CONDUCTION

CROSS-REFERENCE TO RELATED APPLICATIONS

The present application is a continuation of U.S. patent application Ser. No. 13/425,821, filed Mar. 21, 2012, the disclosure of which is incorporated herein by reference.

BACKGROUND

Most computing devices employ some type of authentication to confirm that a user of the device is who he claims to be and to prove that the user is authorized to access the device. Typically, authentication is based on a username and a password. Other forms of authentication may require a user to draw patterns on a screen or to input a secure code. In highly secure situations, retinal or iris-based authentication may be used to identify the user.

SUMMARY

Aspects of the present disclosure relate generally to authentication of a wearable computing device using bone conduction. The computing device may take the form of eyeglasses having at least a bone conduction speaker and a bone conduction microphone. The speaker and the microphone are provided on the device such that when a user wears the eyeglasses, both the speaker and the microphone contact the user's head at positions proximate the user's skull or other bones in the user's head. The user may be authenticated by "fingerprinting" the sound conduction of his/her skull. The fingerprinting may be accomplished by transmitting acoustic signals from the speaker through the user's skull. The signal(s) received at the microphone is a transformed version of the signals output by the speaker. The transformation is dependent on the unique shape of each individual user's head. Some of the signals become attenuated and a delay occurs when the signals are transmitted across the skull. Accordingly, the user may be authenticated based on a frequency response of the signal received at the microphone without requiring the user to input any additional data.

Before a user can be authenticated, an initial calibration process is performed. The user places the wearable computing device on his head and activates the calibration process. An acoustic signal is transmitted from the speaker, and an attenuated signal is received at the microphone as a calibration signal. This attenuated signal is based on acoustic impedances of the skull and frequency-dependent delays. Frequency response characteristics of the calibration signal are saved in device memory to be referenced during the authentication process. In some embodiments, the user may be required to remove the device after the calibration signal frequency response characteristics are recorded, and then place the device back on his head so that a plurality of calibration signals are received and the corresponding frequency response characteristics are saved in memory.

Once the device is calibrated to the user, the user may be authenticated when the device is subsequently worn. A signal is transmitted from the speaker and received at the microphone as an authentication signal. Frequency response characteristics of the authentication signal are compared with the stored calibration signal frequency response characteristics. In the event that the frequency response characteristics of the authentication signal and the calibration signal match, the user is authenticated and the device is enabled for user interaction. If the frequency response characteristics of the authentication signal do not match those of the calibration signal, the user is not authenticated and is prevented from accessing the computing device. Accordingly, the authentication process ensures that data stored in the wearable computing device is only accessible to authorized users.

In one aspect, a computing device that is configured to be wearable on a user's head includes a bone conduction speaker, a bone conduction microphone and a processor. The bone conduction speaker contacts the user's head at a first location thereof. The first location is proximate the user's skull. The bone conduction microphone contacts the user's head at a second location thereof. The processor transmits a first signal from the speaker for reception by the microphone, thereby transmitting sound through the skull, which alters characteristics of the first signal, resulting in a modified second signal. The processor also authenticates the user to the device in the event that characteristics of the second signal match characteristics of a calibration signal.

In another aspect, a computer-implemented method includes transmitting a first signal from a bone conduction speaker through a user's skull. The speaker is positioned at a first location on the user's head proximate the skull. The first signal causes sound to transmit through the skull. A second signal is received at a bone conduction microphone positioned at a second location on the head proximate the skull. The second signal is an altered version of the first signal caused by the sound's transmission through the skull. The user is authenticated to use a device in the event that characteristics of the second signal are substantially similar to characteristics of a calibration signal.

In a further aspect, a computing device is provided. The device is configured to be worn on a user's head, and comprises a bone conduction speaker, a bone conduction microphone, and a processor. The bone conduction speaker is configured to contact the user's head at a first location thereof, the first location being proximate the skull of the user's head. The bone conduction microphone is configured to contact the user's head at a second location thereof, where the second location is proximate the skull of the user's head. The processor, during operation, executes instructions stored in memory to transmit a first signal from the speaker for reception by the microphone thereby transmitting sound through the skull. The transmission alters characteristics of the first signal to produce a second signal. The processor also executes instructions to authenticate the user to the device in the event that characteristics of the second signal match characteristics of a calibration signal.

In one example, the characteristics are frequency response characteristics. In another example, the characteristics are impulse response characteristics.

According to one alternative, the computing device further comprises an eyeglass frame. In this alternative, the speaker and the microphone are attached to the eyeglass frame.

According to another alternative, before the first signal is transmitted, the processor transmits a third signal from the speaker for reception by the microphone thereby to obtain the calibration signal. The characteristics of the calibration signal are stored in memory. In this case, the third signal may have substantially the same frequency spectrum as the first signal.

In another example, in the event that the characteristics of the second signal match the characteristics of the calibration signal, the computing device is enabled for operation by the user. In a further example, in the event that characteristics of the second signal do not match the characteristics of the calibration signal, the computing device is disabled such that the user cannot operate the computing device. And in yet another example, in the event that characteristics of the second signal do not match the characteristics of the calibration signal, the processor prepares a display of a visualization to the user regarding the lack of match, and to request re-authentication of the user.

According to another alternative, the first location and the second location are on opposite sides of the user's head. In a further alternative, the characteristics of the second signal match the characteristics of the calibration signal when the characteristics of the second signal are substantially similar to the characteristics of the calibration signal. Here, the substantial similarity is based on a predetermined margin of error.

In another example, the processor transmits the first signal periodically during a computing session such that the second signal is periodically produced in response to the first signal. In this example, the processor also authenticates the user to the device periodically during the computing session in the event that the characteristics of each second signal matches the characteristics of the calibration signal. And in yet another example, the characteristics of the second signal are obtained by performing a Fast Fourier Transform on the second signal.

In another aspect, a computer-implemented method comprises transmitting a first signal from a bone conduction speaker through a user's skull, the speaker being positioned at a first location on the user's head proximate the skull. The first signal causes sound to transmit through the skull. A second signal is received at a bone conduction microphone positioned at a second location on the head proximate the skull. The second signal is an altered version of the first signal caused by the sound transmitted through the skull. The method also includes authenticating the user to a device in the event that characteristics of the second signal are substantially similar to characteristics of a calibration signal.

In one example, the characteristics are frequency response characteristics. In another example, the characteristics are impulse response characteristics.

In one alternative, the method further comprises calibrating the user to the device to produce the calibration signal. Here, calibrating the user may transmitting a third signal from the speaker through the skull; receiving the calibration signal at the microphone, wherein the calibration signal is an altered version of the third signal caused by sound transmitted through the skull; and storing the characteristics of the calibration signal in memory of the device. In this case, the third signal may have substantially the same frequency spectrum as the first signal.

In another example, the characteristics of the second signal are substantially similar to the characteristics of the calibration signal when the characteristics of the second signal are within a predetermined margin of error relative to the characteristics of the calibration signal. In a further example, the first signal is transmitted periodically during a computing session such that the second signal is periodically produced in response to the first signal. Here, the user is authenticated periodically during the computing session in the event that the characteristics of each second signal are substantially similar to characteristics of the calibration signal.

In one alternative, the method further comprises performing a Fast Fourier Transform on the calibration signal and the second signal to obtain the characteristics of the calibration signal and the second signal, respectively.

In another alternative, the method further comprising provides a visualization on a display of the device, wherein the visualization indicates whether the user is authenticated to the device. In one scenario, the visualization indicates that a re-authentication of the user is to be performed prior to enabling the user to use the device. And in another scenario the visualization indicates to the user that one or both of the speaker and the microphone should be repositioned on the user's head prior to performing a re-authentication operation.

And according to another aspect, a computing device comprises a bone conduction speaker, a bone conduction microphone, a processor and a headset. The bone conduction speaker is configured to transmit a first signal through a cavity. The bone conduction microphone is configured to receive a second signal, wherein the second signal is an altered version of the first signal caused by the cavity. The processor, during operation, executes instructions stored in memory to authenticate a user to the device in the event that characteristics of the second signal are substantially similar to characteristics of a calibration signal. And the headset comprises an eyeglass frame. The speaker and the microphone are attached to the eyeglass frame.

In one example, the characteristics are frequency response characteristics. In another example, the characteristics are impulse response characteristics.

According to one alternative, before the first signal is transmitted, the processor transmits a third signal from the speaker for reception by the microphone to obtain the calibration signal. Here, the characteristics of the calibration signal are stored in memory.

According to another alternative, in the event that the characteristics of the second signal are substantially similar to the characteristics of the calibration signal, the computing device is enabled for operation by the user. In this case, the characteristics of the second signal may be substantially similar to the characteristics of the calibration signal when the characteristics of the second signal are within a predetermined margin of error relative to the characteristics of the calibration signal.

In another example, the characteristics of the second signal are obtained by performing a Fast Fourier Transform on the second signal. And in a further example, the processor provides a visualization of the characteristics on a display of the headset.

BRIEF DESCRIPTION OF THE DRAWINGS

FIG. 3 illustrates an example schematic drawing of a computer network infrastructure for use with aspects of the disclosure.

DETAILED DESCRIPTION

The present disclosure is directed to the use of bone conduction to authenticate a wearable computing device. A bone conduction speaker and a bone conduction microphone are provided on the device at different positions. When a user wears the device, both the speaker and the microphone contact the user's head at positions proximate the user's skull. A calibration process is performed by transmitting a signal from the speaker through the user's skull. Frequency response characteristics of a calibration signal received at the microphone are saved in device memory for reference during a subsequent authentication process.

The authentication process is performed by "fingerprinting" the sound conduction of the skull. The fingerprinting may be accomplished by transmitting signals of different frequencies from the speaker through the user's skull. Some of the signals may become attenuated and/or delayed. The signals received at the microphone are authentication signals that have been transformed by the shape and other features of the user's head. Frequency response characteristics of the authentication signals are then compared to the frequency response characteristics of the calibration signal to determine whether to authenticate the user without requiring the user to input any additional data.

In some embodiments, the transmitted signals may be a series of short impulses, where each impulse contains a wide bandwidth of frequencies. The inverse Fourier transform of the frequency response of the pulse, known as the finite impulse response, may also produce a unique authentication fingerprint.

Figure 1:
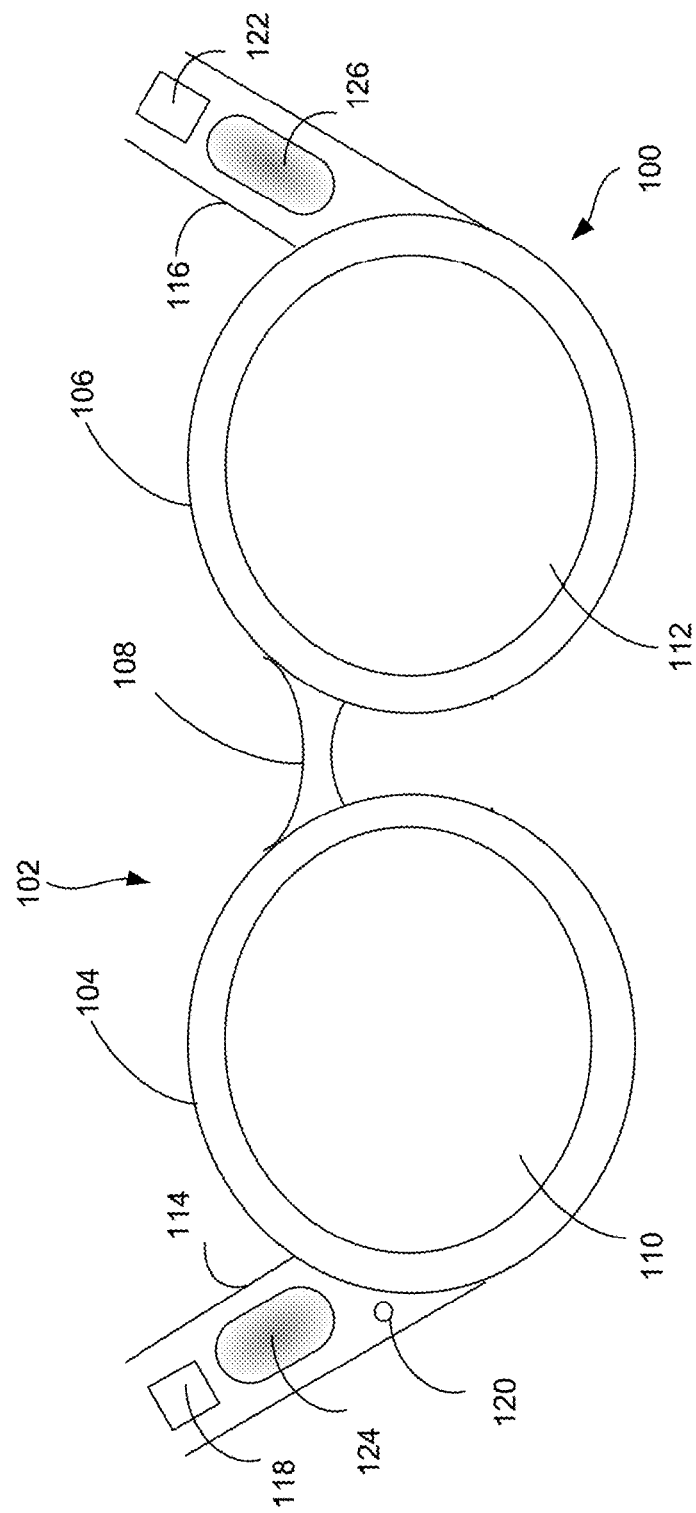
FIG. 1 illustrates an example system for receiving, transmitting, and displaying data according to aspects of the disclosure.

FIG. 1 illustrates an example system 100 for receiving, transmitting, and displaying data. The system 100 is shown in the form of a wearable computing device. While FIG. 1 illustrates eyeglasses 102 as an example of a wearable computing device, other types of wearable computing devices could additionally or alternatively be used. As illustrated in FIG. 1, the eyeglasses 102 comprise frame elements including lens-frames 104, 106 and a center frame support 108, lens elements 110, 112, and extending side-arms 114, 116. The center frame support 108 and the extending side-arms 114, 116 are configured to secure the eyeglasses 102 to a user's face via a user's nose and ears, respectively. Each of the frame elements 104, 106, 108 and the extending side-arms 114, 116 may be formed of a solid structure of plastic or metal, or may be formed of a hollow structure of similar material so as to allow wiring and component interconnects to be internally routed through the eyeglasses 102. Each of the lens elements 110, 112 may be formed of any material that can suitably display a projected image or graphic. Each of the lens elements 110, 112 may also be sufficiently transparent to allow a user to see through the lens element. Combining these two features of the lens elements 110, 112 can facilitate an augmented reality or heads-up display where the projected image or graphic is superimposed over a real-world view as perceived by the user through the lens elements 110, 112.

The extending side-arms 114, 116 are each projections that extend away from the frame elements 104, 106, respectively, and portions thereof are positioned behind or otherwise adjacent to a user's ears to secure the eyeglasses 102 to the user. The extending side-arms 114, 116 may further secure the eyeglasses 102 to the user by extending around a rear portion of the user's head. Additionally or alternatively, for example, the system 100 may connect to or be affixed within a head-mounted helmet structure. Other possibilities exist as well.

The system 100 may also include an on-board computing system 118, a video camera 120, one or more sensors 122, and finger-operable touch pads 124, 126. The on-board computing system 118 is shown to be positioned on the extending side-arm 114 of the eyeglasses 102; however, the on-board computing system 118 may be provided on other parts of the eyeglasses 102. The on-board computing system 118 may include a processor and memory, for example. The on-board computing system 118 may be configured to receive and analyze data from the video camera 120 and the finger-operable touch pads 124, 126 (and possibly from other sensory devices, user interfaces, or both) and generate images for output from the lens elements 110, 112.

The video camera 120 is shown to be positioned on the extending side-arm 114 of the eyeglasses 102; however, the video camera 120 may be provided on other parts of the eyeglasses 102. The video camera 120 may be configured to capture images at various resolutions or at different frame rates. Many video cameras with a small form-factor, such as those used in cell phones or webcams, for example, may be incorporated into an example of the system 100. Although FIG. 1 illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown mounted on the extending side-arm 116 of the eyeglasses 102; however, the sensor 122 may be provided on other parts of the eyeglasses 102. The sensor 122 may include one or more of a gyroscope or an accelerometer, for example. Other sensing devices may be included within the sensor 122 or other sensing functions may be performed by the sensor 122.

The finger-operable touch pads 124, 126 are shown mounted on the extending side-arms 114, 116 of the eyeglasses 102. Each of finger-operable touch pads 124, 126 may be used by a user to input commands. The finger-operable touch pads 124, 126 may sense at least one of a position and a movement of a finger via capacitive sensing, resistance sensing, or a surface acoustic wave process, among other possibilities. The finger-operable touch pads 124, 126 may be capable of sensing finger movement in a direction parallel or planar to the pad surface, in a direction normal to the pad surface, or both, and may also be capable of sensing a level of pressure applied. The finger-operable touch pads 124, 126 may be formed of one or more translucent or transparent insulating layers and one or more translucent or transparent conducting layers. Edges of the finger-operable touch pads 124, 126 may be formed to have a raised, indented, or roughened surface, so as to provide tactile feedback to a user when the user's finger reaches the edge of the finger-operable touch pads 124, 126. Each of the finger-operable touch pads 124, 126 may be operated independently, and may provide a different function.

Figure 2:
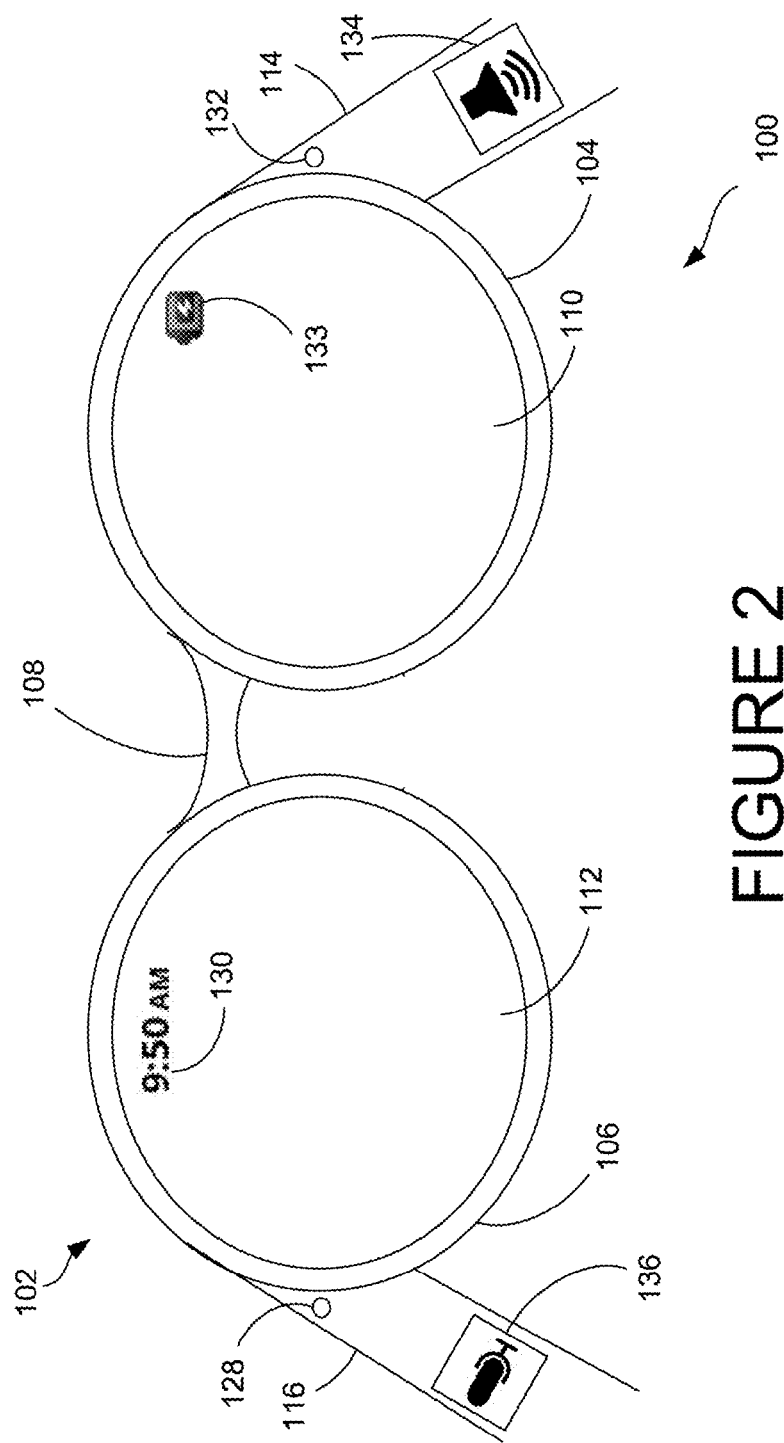
FIG. 2 illustrates an alternate view of the system of FIG. 1.

FIG. 2 illustrates an alternate view of the system 100 of FIG. 1. As shown in FIG. 2, the lens elements 110, 112 may act as display elements. The eyeglasses 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 133 onto an inside surface of the lens element 110.

The lens elements 110, 112 may act as a combiner in a light projection system and may include a coating that reflects the light projected onto them from the projectors 128, 132. In some embodiments, a special coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

The eyeglasses 102 may include a transmitter-transducer such as a bone conduction speaker 134 coupled to an inside surface of the extending side-arm 114. The eyeglasses 102 may include a receiver-transducer such as a bone conduction microphone 136 coupled to an inside surface of the extending side-arm 116. Although the speaker 134 and the microphone 136 are shown to be on opposite extending side-arms 114, 116, both the speaker 134 and the microphone 136 may be positioned on the same extending side-arm 114 or 116 or elsewhere along the eyeglasses 102. The speaker 134 is configured to transmit a signal to the receiver 136.

FIG. 3 illustrates an example schematic drawing of a computer network infrastructure for use with aspects of the disclosure. In one system 140, a device 142 communicates using a communication link 144 (e.g., a wired or wireless connection) to a remote device 146. The device 142 may be any type of device that can receive data and display information corresponding to or associated with the data. For example, the device 142 may be a heads-up display system, such as the eyeglasses 102 described with reference to FIGS. 1 and 2.

Thus, the device 142 may include a display system 146 comprising a processor 150 and a display 152. The processor 150 may be included in on-board computing system 118, and the display 152 may correspond to display 130 or 133. The display 152 may be, for example, an optical see-through display, an optical see-around display, or a video see-through display. The processor 150 may receive data from the remote device 146, and configure the data for display on the display 152. The processor 150 may be any type of processor, such as a micro-processor or a digital signal processor, for example.

The device 142 may further include on-board data storage, such as memory 154 coupled to the processor 150. The memory 154 may store software that can be accessed and executed by the processor 150, for example.

The remote device 146 may be any type of computing device or transmitter including a laptop computer, netbook, tablet PC, mobile telephone, etc., that is configured to transmit data to the device 142. The remote device 146 and the device 142 may contain hardware to enable the communication link 144, such as processors, transmitters, receivers, antennas, etc.

In FIG. 3, the communication link 144 is illustrated as a wireless connection; however, wired connections may also be used. For example, the communication link 144 may be a wired link via a serial bus such as a universal serial bus, or a parallel bus. A wired connection may be a proprietary connection as well. The communication link 144 may also be a wireless connection using, e.g., Bluetooth® radio technology, communication protocols described in IEEE 802.11 (including any IEEE 802.11 revisions), cellular technology (such as GSM, CDMA, UMTS, EV-DO, WiMAX, or LTE), or Zigbee® technology, among other possibilities. The remote device 146 may be accessible via the Internet and may comprise a computing cluster associated with a particular web service (e.g., social-networking, photo sharing, address book, etc.).

In addition to the operations described below and illustrated in the figures, various operations in accordance with example embodiments will now be described. It should also be understood that the following operations do not have to be performed in the precise order described below. Rather, various steps can be handled in a different order or simultaneously, and may include additional or fewer operations.

Figure 4A:
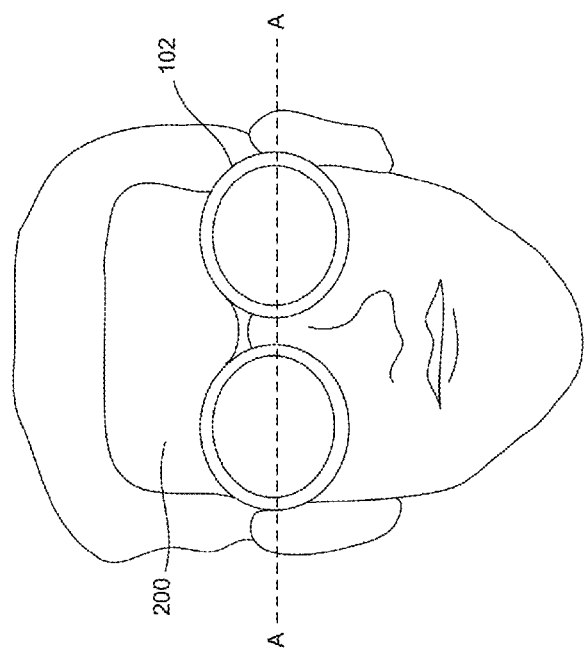
FIGS. 4a and 4b illustrate a wearable computing device in accordance with an example embodiment.
Figure 4B:
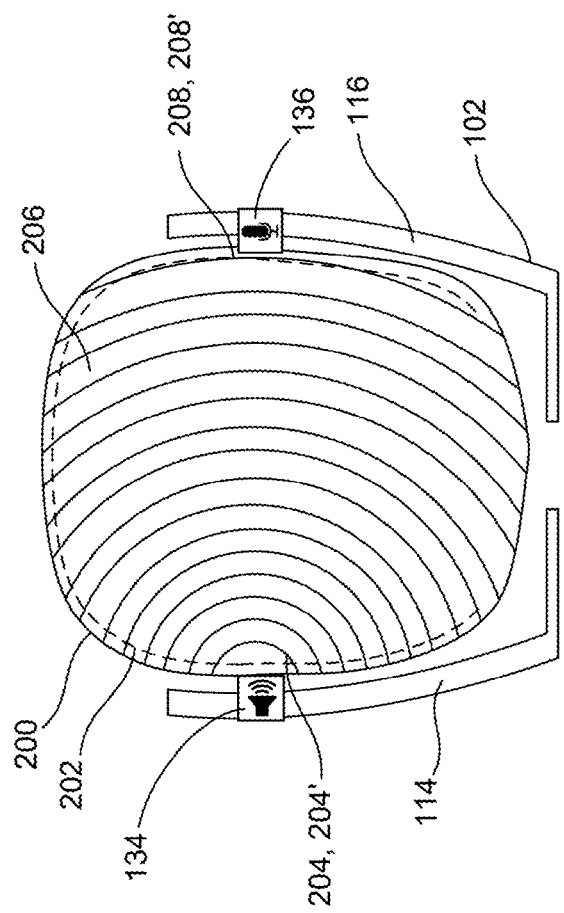

FIGS. 4a and 4b illustrate a user wearing the wearable computing device described above with reference to FIGS. 1-3. FIG. 4a is a front view showing the user wearing the eyeglasses 102, and FIG. 4b is a cross-sectional view of FIG. 4a taken along line A-A. When the user is wearing the eyeglasses 102, the speaker 134 and the microphone 136 contact the user's head 200 at locations proximate the user's skull 202 or other bones in the user's head.

Before a determination can be made as to whether the user is authenticated to interact with the wearable computing device, a calibration process is performed. The calibration process may commence after the user positions the eyeglasses 102 on his head 200 such that the speaker 134 and the receiver 136 abut the user's head 200 at positions proximate the skull 202. In one embodiment, the speaker 134 may be positioned on the extending side-arm 114 of the eyeglasses 102 such that the speaker 134 abuts the user's head 200 at a position behind or otherwise adjacent to the ear. Accordingly, the speaker 134 is located about a skin thickness away from the user's skull 202. The microphone 136 may be similarly positioned on the opposite extending side-arm 116. The speaker 134 and the microphone 136 may be positioned anywhere along the extending side-arms 114, 116, and both the speaker 134 and the microphone 136 may be positioned on the same extending side-arm 114 or 116. After the eyeglasses 102 are positioned on the user's head 200, the user may activate the calibration process using, for example, at least one of the finger-operable touch pads 124, 126.

In response to initiating the calibration process, such as by user activation, one or more signals 204 are generated. The signals 204 may cover a wide range of different frequencies (e.g., 15 Hz-100 kHZ). The speaker 134 may output the signals 204 as pulses in the direction of the user's head 200. The amount of energy that the speaker 134 is outputting on one side of the skull 202 is known. The user's skull 202 behaves like a cavity 206 such that the physical characteristics of the skull 202 affect the properties of the transmitted signals 204. For example, the dimensions and/or volume of the user's skull 202 may act on the frequency(ies) of the transmitted signal(s) 204. For instance, a delay between the initiation of sound at the speaker 134 and its reception at the microphone 136 may vary depending on the size of the user's skull 202. In addition, the dimension and volume of the user's skull 202 may delay or attenuate the transmitted signals 204 differently depending on frequency. Accordingly, attenuated calibration signals 208 received at the receiver 136 have different properties than the corresponding transmitted signals 204. The properties of the calibration signals 208 are stored in the computing device, such as in the memory 154.

The calibration signals 208 are recorded using the receiver 136 and a Fast Fourier Transform (FFT) may be performed on the calibration signals 208 to identify the power spectrum. The different frequencies received at the microphone 136 are categorized into appropriate spectral or frequency bins identified by frequency range (e.g., 15-18 Hz, 18-25 Hz, 25-40 Hz, 40-100 Hz, 100-200 Hz, 200-500 Hz, 500-1500 Hz, 1500-3000 Hz, 3000-7000 Hz, 7000-13 kHz, 13 k-20 kHz, 20 k-40 kHz, 40 k-70 kHz, 70 k-100 kHz). Since frequencies tend to group logarithmically, the logarithmic distribution of the signal frequency ranges provided by the different bins promotes the identification of different acoustic impedances in the skull as well as acoustic delays that depend on frequency.

In one illustrative example, fourteen different frequency bins are provided. A pulse of white noise is created at the speaker 134. The microphone 136 receives power level values that are sorted according to the bins. The power level values may be normalized by the total power observed in the spectrum. Each frequency bin is associated with some percentage of the total power. The relative power value in each frequency bin may be more important than the absolute power across all of the frequency bins. In an alternative, the system may compare the total power input into the system from the speaker with the total received power to arrive at an attenuation in, e.g., decibels (dB).

After the frequency response characteristics (e.g., power levels) of the initial calibration signals 208 are sorted into the appropriate frequency bins (or the overall attenuation is determined) and stored in memory, the user may be prompted to remove the eyeglasses 102 and put the eyeglasses 102 on again. Invariably, the locations where the speaker 134 and the microphone 136 contact the user's head 200 and the amount of pressure applied on the user's skin from the speaker 134 and the microphone 136 will be slightly different than when the previous calibration signals 208 were received at the microphone 136. After the eyeglasses 102 are repositioned on the user's head 200, one or more signals (e.g., white noise pulse) are output from the speaker 134 and the corresponding attenuated, calibration signals are received at the microphone 136. The different locations and/or pressures of the speaker 134 and the microphone 136 on the user's head may result in attenuated calibration signals received at the microphone 136 that have slightly different characteristics than the previously received calibration signals 208. The different frequencies received at the microphone 136 are categorized into appropriate bins identified by frequency range, or the overall attenuation is determined, as discussed above.

The process of sending the signal 204 from the speaker 134, receiving the calibration signal 208 at the microphone 136, sorting the frequency response characteristics of the calibration signal 208 into the frequency bins (or determining the overall attenuation), and having the user remove and reposition the eyeglasses 102 on his head 200 may be repeated a number of times during the calibration process.

In some embodiments, the user may be prompted to move his head 200 in a particular direction before the next signal is transmitted from the speaker 134. In some embodiments, the user may be prompted using an audio signal transmitted from the speaker 134 or from a projection displayed on display 130 or 133. By repositioning his head 200 and therefore the eyeglasses 102, the user may cause the speaker 134 and the microphone 136 to be repositioned at different locations proximate his skull 202 thereby likely resulting in a slightly different calibration signal being received at the microphone 136.

Since the frequency response of the attenuated signals resulting from the transmission of multiple calibration signals 208 are stored in the memory 154, the user may be associated with a particular frequency range provided by the attenuated signals. The different power levels sorted into each bin may be averaged for the range of signal attenuations. Accordingly, the affect of a slight repositioning of the eyeglasses 102 on the user's head 200 during a subsequent authentication process can be taken into account and offset.

In one illustrative example, the average power level in the different frequency bins may represent relative strengths of different frequency bands. For instance, if there are fourteen bins, they may have the following values (starting with the lowest frequency bin): 100, 90, 50, 20, 10, 5, 4, 3, 7, 3, 2, 2, 3, and 2. Here, the lowest band (associated with the first frequency bin) has the highest value, so the lowest frequency band (e.g., 15-18 Hz) is set to a relative strength of 100 and the other frequency bands are normalized relative to the lowest band. A different wearable computing device may be calibrated for a different user using the same process, such that the average power level for the different bins may also represent relative strengths of different frequency bands. In some embodiments, the average power level may be determined using an amount of attenuation (e.g., in dB). In this case, the lower frequency bands may show less attenuation while the higher frequency bands may show more attenuation.

In some cases, it may be necessary to recalibrate the user to the computing device. For example, a child's skull may change shape with the advancement of age, or complex dental work may result in the skull behaving differently. An adaptation process may be performed to recalibrate the user to the device due to the change in skull features causing sound to pass through the skull differently. The adaption process is essentially the same as the calibration process described above. In some embodiments, the user may be required to authenticate himself in a different way (e.g., username/password combination) before the adaptation process is performed.

Once the computing device is calibrated to the user, the user may be subsequently authenticated for that device. The user may initiate the authentication process by first positioning the eyeglasses 102 on his head 200 such that the speaker 134 and the receiver 136 abut the user's head 200 at a position proximate the skull 202 and then activating at least one of the finger-operable touch pads 124, 126. Similar to the calibration process described above, the speaker 134 and the microphone 136 may be positioned on at least one of the extending side-arms 114, 116 of the eyeglasses 102 such that the speaker 134 and the microphone 136 abut the user's head 200 at a position near the skull 202.

In response to activation of the authentication process, the bone conduction speaker 134 outputs a signal 204' at one or more frequencies (e.g., 15 Hz-100 kHz). In some embodiments, the speaker 134 is a voice coil that is tuned to interface with the user's skull 202 by abutting the user's head 200 proximate a bony portion of the head 200.

The signal 204' that is transmitted from the speaker 134 during the authentication process may take a number of different forms of signals that cause transmission of sound through the user's skull. Example signals include a chirp signal transmitted at a band of frequencies, an audio tone that starts at a low pitch and rises in pitch (or vice versa), a signal that is constructed to have particular frequencies, or a white noise source that includes all audible and some inaudible frequencies.

In one example, the signal 204' is transmitted as a burst of white noise for about 0.5 seconds in order to obtain a suitable sample. The longer the burst lasts, the more the power spectrum can be averaged, thereby producing improved results. However, the inconvenience to the user due to, for example, noise and delay in authenticating, should be balanced against accuracy. Accordingly, the white noise burst may be replaced by a signal sweep (chirp) from low frequencies to high frequencies which would produce more accurate results but at a greater delay.

The signal 204 (or signals) transmitted from the speaker 134 travels through the cavity 206 defined by the user's skull 202 and any resulting attenuated signal(s) are received at the microphone 136 as an authentication signal 208'. Some frequencies such as lower frequencies may conduct along the bone plate, while other frequencies such as higher frequencies may conduct through the cavity 206. Frequency response characteristics of the authentication signal 208' are then determined. The frequency response characteristics of the authentication signal 208' may vary based on the shape and size of the user's skull 202. A Fast Fourier Transform (FFT) may be performed on the attenuated signals to identify the power spectrum. New power level values are then identified and sorted into in the frequency bins (e.g., 102, 90, 55, 20, 10, 5, 4, 4, 7, 3, 2, 3, 3 and 2). A Euclidean distance may be identified between the new values and the average power levels from the calibration process.

In some embodiments, more than one signal is sent from the speaker 134 to the microphone 136 during the authentication process. For example, a second signal may be transmitted that has a different tone than the first transmitted signal. Before the second tone is output from the speaker 134, the user may be prompted to adjust the eyeglasses 102 because, for example, the speaker 134 and the microphone 136 may not be abutting against the user's head 200 properly or may not be positioned close enough to a bone. There may be a range of pressures at which the speaker 134 and the microphone 136 abut against the user's head 200 for the device to be considered properly engaged with the head 200 for adequate bone conduction to occur. In one example, 80 grams of pressure on a contact point of approximately 0.5 cm$^2$ is sufficient to properly engage the speaker 134 or microphone 136 against the user's head 200. If there is insufficient pressure, the connection between the speaker/microphone and the bone is inadequate. If there is too much pressure, the device may be uncomfortable to the user.

A determination is then made if the authentication signal(s) 208' received at the microphone 136 share(s) the same frequency response characteristics as the calibration signal(s) 208. In other words, a determination is made whether the skull of the user that calibrated the device has the same size and shape as the skull of the user that seeks authentication. Since most humans have skulls that are uniquely sized and shaped relative to other humans, the frequency response of each skull may provide a unique "head print" by which a user can be identified and authenticated. Specifically, the frequency response characteristics of the authentication signal 208' are compared to the frequency response characteristics of the calibration signal 208. In the event that there is a match, the user is authenticated and the device is enabled for the user. Similarly, if the frequency response characteristics of the authentication signal 208' do not match the frequency response characteristics of the calibration signal 208 that are stored in the memory 154, the user is not authenticated and therefore cannot interact with the device.

As described above, frequency response characteristics for a range of calibration signals 208 are stored in the memory 154. Accordingly, an authentication signal 208' that has frequency response characteristics that fall within the range would result in the device being enabled for the corresponding user. Similarly, an authentication signal that has frequency response characteristics that are nearly identical to the stored calibration signal within, for example, a range of ±5.0% of the minimum distance between different users' "head prints" may be considered an acceptable margin of error to authenticate the user. The range for an acceptable margin of error is selected such that user misidentification will not result while also taking into consideration that two users may have very similarly shaped skulls.

In some embodiments, the authentication process is performed periodically such that the user's identity may be checked repeatedly. In one embodiment, the authentication process is performed every thirty seconds. By periodically authenticating the user, the following scenario can be prevented. A user is authenticated for the computing device and initiates in a computing session. The user removes the wearable computing device and an unauthorized user puts on the eyeglasses 102 before the session times out. In this case, the unauthorized user would not be prevented from nefariously interacting with the computing device unless a subsequent authentication process is performed and the device is disabled after the user cannot be authenticated.

The periodically performed authentication process may determine that the authentication signal 208' does not match the calibration signal 208. The process may include displaying feedback to the user. For instance, rather than immediately identifying the user as unauthenticated and disabling user access to the device, a visual indication of a series of the user's recently recorded "head prints" may be projected by one of the projectors 128, 132 onto an inside surface of one of the lens elements 110, 112. The user may then observe the visual indication and determine (or may be instructed by the process) that the eyeglasses 102 should be adjusted to change the position of the speaker 134 and/or the microphone 136 to obtain an accurate authorization signal 208' reading at the microphone.

There are many variables that may cause an authorized user to not be authenticated or an unauthorized user to be authenticated. For example, dehydration may cause sound to be transmitted through the skull 202 differently such that the authorization signal 208' falls outside an acceptable margin of error relative to the calibration signal 208. In the event that an incorrect authentication occurs, another authentication process may be performed. For example, a user who has not been calibrated to the computing device may have a skull that is essentially the same size and shape as a user that has been calibrated to the device. The authentication process may be altered such that a pass code would be input to the device before a secondary authentication process is performed that compares frequency responses of the authentication signal 208' with the calibration signal 208.

The secondary process of matching the authentication signal 208' with the calibration signal 208 may be combined with other primary authentication processes. As described with reference to FIG. 1, the device is equipped with the sensor 122, which may include one or more of a gyroscope, an accelerometer, or some other type of inertial measurement unit. The sensor 122 may be used to detect when the eyeglasses 102 have been removed from the user's head 200. When a user puts the eyeglasses 102 back on, rather than prompting the user for a pass code, the device may authenticate the new user based on the process of matching the authentication signal 208' to the calibration signal 208. If there is not a match, the new user may be prompted to enter the pass code before the device is enabled for user interaction. In some embodiments, the sensor 122 may be used in conjunction with the microphone 136 to receive the calibration signal 208 and the authentication signal 208'.

In some embodiments, the following additional methods may be used to compare head prints to authenticate the user: an N nearest neighbor metric using the sampled power levels, a support vector machine, a neural net, or any known pattern recognition/machine learning technique. If there is not a match that is within an acceptable range of values, the authentication may be performed again, or the user may be prompted to enter a password manually. If authentication is performed by manually entering a password, the calibration may be updated using the new values, but the update may be automatic based on the failure of the sound method.

The finite impulse response may be correlated with a known recorded impulse response for the user. This method is mathematically analogous to sweeping frequencies in a chirp and calculating the FFT. Instead of using FFT power levels and comparing frequency responses, this example uses the impulse response directly and compares the transmitted and received signals in the time domain. A matched filter may be created from multiple calibration pulses to be used as a future template of the user's unique skull characteristics to correlate against.

Figure 5:
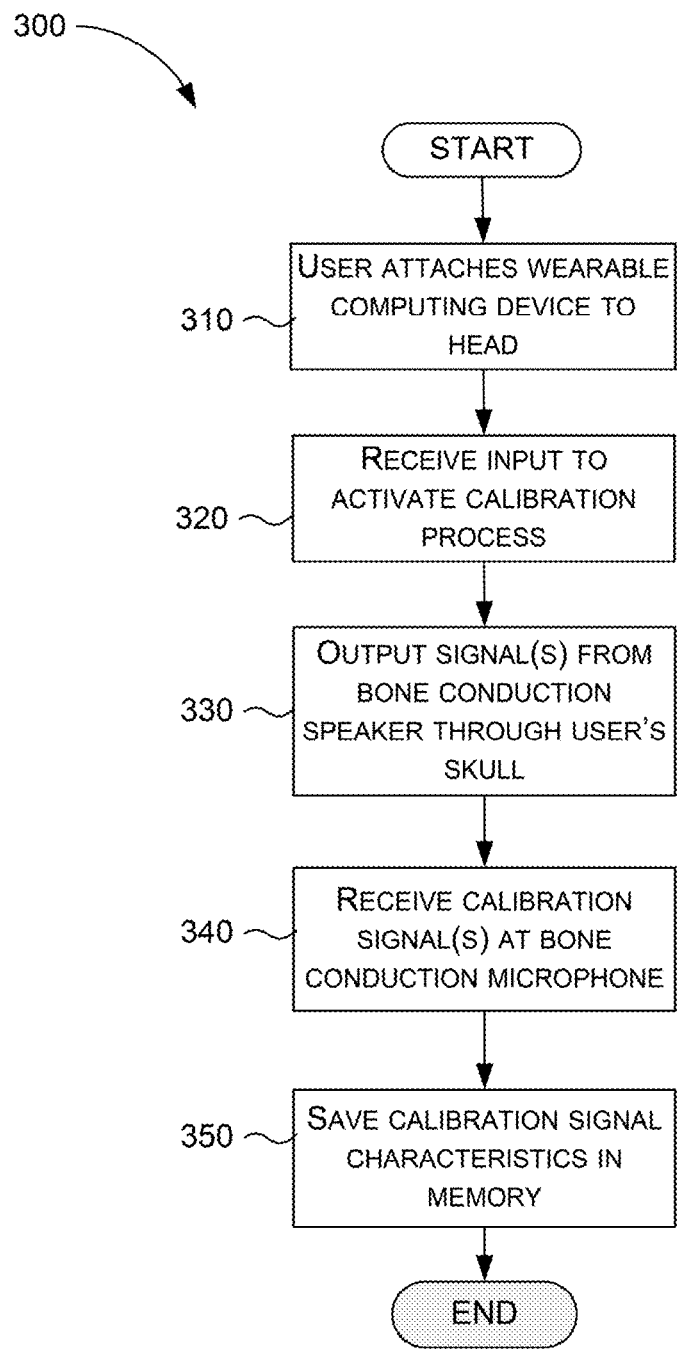
FIG. 5 is a flow diagram in accordance with an example embodiment.

FIG. 5 is a flow diagram illustrating a wearable computing device calibration process in accordance with an example embodiment. The calibration process 300 begins when the user attaches the wearable computing device to his head (block 310). The wearable computing device may take the form of eyeglasses having a bone conduction speaker and a bone conduction microphone attached thereto. When the user puts the eyeglasses on, the speaker and the microphone are positioned proximate the user's skull. For example, the speaker and the microphone may contact the user at the temples or at a location behind the ears. The speaker and the microphone may be positioned on opposite sides of the user's head. Alternatively, the speaker and the microphone are positioned on the same side of the user's head at a distance of at least one centimeter apart from each other.

The device receives an input to activate the calibration process (block 320). The user may activate a control on the wearable computing device to provide the input to initiate the calibration process.

A signal is output from the bone conduction speaker through the user's skull (block 330). Example types of signals include a chirp signal transmitted across a band of frequencies, an audio tone that starts at a low pitch and rises in pitch (or vice versa), a signal that is constructed to have particular frequencies, or a white noise source that may include all audible frequencies and some inaudible frequencies.

The proximity of the speaker to the user's skull causes sound to be transmitted through the skull in response to the transmitted signal. The size and shape of the user's skull has a characteristic frequency response, where the signal transmitted from the speaker is attenuated differently at different frequencies. The attenuated signal is referred to as a calibration signal. The calibration signal is received at the bone conduction microphone (block 340).

The frequency response characteristics of the calibration signal are stored in device memory for subsequent retrieval during the authentication process (block 350). Specifically, as described above, a Fast Fourier Transform (FFT) may be performed on the stored calibration signal, extracting the power spectrum and categorizing the power of the different frequencies into appropriate bins.

In some embodiments, more than one signal is transmitted from the speaker to the microphone. Variations in the location and pressure where the speaker and the microphone contact the user's head may result in slightly different calibration signal frequency response characteristics being stored in device memory. Accordingly, the user may be associated with a range of frequency response characteristics corresponding to the different calibration signals received at the microphone.

Figure 6:
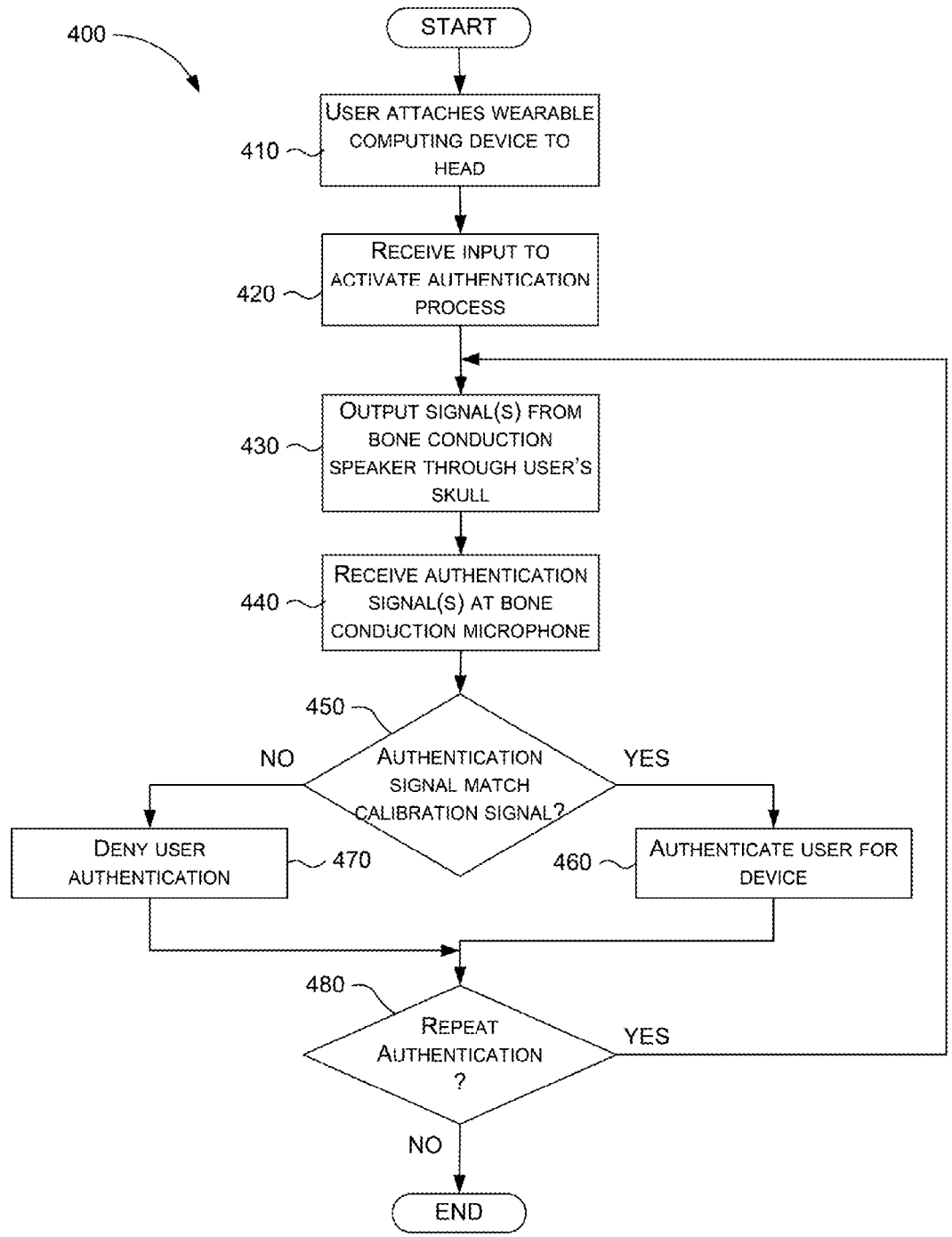
FIG. 6 is a flow diagram in accordance with an example embodiment.

FIG. 6 is a flow diagram illustrating a wearable computing device authentication process in accordance with an example embodiment. The authentication process 400 begins when the user attaches the wearable computing device to his head (block 410). As discussed above, the wearable computing device may take the form of eyeglasses having attached thereto a bone conduction speaker and a bone conduction microphone. When the eyeglasses are worn, both the speaker and the microphone contact the user's head at a location proximate the user's skull. The device receives an input to activate the authentication process (block 420). The input may be received in response to the user activating a sensor or a button on the device.

Similar to the calibration signal discussed above, a signal is output from the bone conduction speaker through the user's skull (block 430). Since the speaker is near the user's skull, transmission of the signal causes sound to transmit through the skull. The unique physical characteristics of the user's skull alter the frequency response characteristics of the signal transmitted from the speaker. The attenuated signal received at the bone conduction microphone is referred to as an authentication signal (block 440).

In some embodiments, multiple signals are transmitted through the user's skull from the speaker to the microphone during the authentication process. The signals may be different from each other. The user may be prompted to adjust the eyeglasses after each signal is transmitted to change the location and/or pressure of the microphone and the speaker.

The frequency response characteristics of the calibration signal are retrieved from device memory, and a determination is made whether the frequency response characteristics of the authentication signal match the frequency response characteristics of the calibration signal (block 450). In some embodiments, the characteristics are obtained from the signals using a Fast Fourier Transform.

In other signal processing techniques, the speed of sound may be used along with an acoustic impedance of the user's head to obtain the frequency response of the head. A sound requires more time to traverse between the speaker and microphone for a large head than for a small head. In addition, when a signal impulse is generated at the speaker, a response received at the microphone may include multiple wave fronts. For example, one signal may travel through the skull bone on one side, straight across the brain and its fluids, and through the skull bone at the other side. Another signal may arrive at the microphone traveling purely through the skull bone. Such signals may be distinguished based on arrival time and received signal strength. The length of time that it takes for a signal to travel through a live human head may be related to a width and circumference of the head. In effect, another "head print" may be obtained from the different arrival times of an audio signal impulse due to the various structures in the head.

In some embodiments, the frequency response characteristics of the two signals are determined to match when the characteristics are identical or substantially similar. For example, the authentication signal may match the calibration signal when the frequency response characteristics match within a range of acceptable values (e.g., ±5.0%).

If the frequency response characteristics of the authentication signal match the frequency response characteristics of the calibration signal, processing proceeds to block 460 where the user is authenticated for the device. Accordingly, the device is enabled for user interaction, and the authentication process proceeds to lock 480.

If the frequency response characteristics of the authentication signal do not match the frequency response characteristics of the calibration signal, processing proceeds to block 470 where the user authentication is denied for the device, and the authentication process proceeds to block 480.

A determination is made whether another authentication process is to be performed (block 480). In some embodiments, the authentication process is performed periodically to determine if a different user has accessed the computing device before the computing session has terminated. If the authentication process is to be performed periodically, processing returns to block 430 where another signal is transmitted from the speaker and is received as an authentication signal at the microphone; otherwise, processing terminates.

As described above, a wearable computing device may be authenticated without requiring any active input from a user. The wearable computing device includes a bone conduction speaker and a bone conduction microphone. A calibration process is performed by transmitting a signal from the speaker that abuts against the user's head proximate his skull. Sound is transmitted through the skull in response to the signal, and a calibration signal is received at the microphone. Frequency response characteristics of the calibration signal are stored in device memory for subsequent retrieval. An authentication process is subsequently performed by transmitting a signal from the speaker and receiving an authentication signal at the microphone. In the event that the authentication signal has substantially the same frequency response characteristics as the calibration signal, the user is authenticated and the device is enabled for user interaction.

As these and other variations and combinations of the features discussed above can be utilized without departing from the scope of the claims, the foregoing description of exemplary embodiments should be taken by way of illustration rather than by way of limitation. It will also be understood that the provision of examples (as well as clauses phrased as "such as," "e.g.", "including" and the like) should not be interpreted as limiting; rather, the examples are intended to illustrate only some of many possible aspects.

The invention claimed is:

1. A computing device configured to be worn by a user, the computing device comprising:
a transmitter-transducer configured to contact the user at a first location on the user;
a receiver-transducer configured to contact the user at a second location on the user; and
a processor operatively coupled to the transmitter-transducer and the receiver-transducer, the processor being configured to:
transmit a first signal via the transmitter-transducer for reception by the receiver-transducer, thereby transmitting sound between the first location and the second location on the user, the transmission altering characteristics of the first signal to produce a second signal;
obtain one or more calibration signals from the second signal; and
store calibration signal characteristics of the obtained one or more calibration signals in memory.

2. The computing device of claim 1, wherein the processor is further configured to authenticate the user to the computing device in the event that characteristics of a new second signal received by the receiver-transducer match the stored calibration signal characteristics.

3. The computing device of claim 2, wherein the characteristics of the new second signal match the characteristics of the stored calibration signal characteristics when the characteristics of the second signal are determined to be within a predetermined margin of error relative to the stored calibration signal characteristics.

4. The computing device of claim 2, wherein, upon authentication, the processor is configured to enable the computing device for operation by the user.

5. The computing device of claim 2, wherein, in the event that characteristics of the new second signal do not match the characteristics of the stored calibration signal, the processor is configured to disable the computing device such that the user cannot operate the computing device.

6. The computing device of claim 1, wherein, when the user is not authenticated, the processor is configured to present information to the user regarding the lack of match, and to request re-authentication of the user.

7. The computing device of claim 1, wherein the calibration signal characteristics include one or both of frequency response characteristics and impulse response characteristics.

8. The computing device of claim 1, wherein the processor is configured to cause the transmitter-transducer to emit the first signal periodically during a computing session such that the second signal is periodically produced in response to the first signal.

9. A computer-implemented method comprising:
transmitting, by a processor via a transmitter-transducer of a computing device worn by a user, a first sound signal through a first location on the user;
receiving a second sound signal at a receiver-transducer of the computing device positioned at a second location on the user, the second sound signal being an altered version of the first sound signal caused by transmission of sound between the first location and the second location;
obtaining one or more calibration signals from the second signal; and
storing calibration signal characteristics of the obtained one or more calibration signals in memory.

10. The computer-implemented method of claim 9, further comprising authenticating the user to the computing device in the event that characteristics of a new second sound signal received by the receiver-transducer match the stored calibration signal characteristics.

11. The computer-implemented method of claim 10, wherein the characteristics of the new second sound signal match the characteristics of the stored calibration signal characteristics when the characteristics of the second sound signal are determined to be within a predetermined margin of error relative to the stored calibration signal characteristics.

12. The computer-implemented method of claim 10, wherein upon authentication, the method further comprises enabling the computing device for operation by the user.

13. The computer-implemented method of claim 10, wherein, in the event that characteristics of the new second sound signal do not match the characteristics of the stored calibration signal, the method further comprises disabling, by the processor, the computing device such that the user cannot operate the computing device.

14. The computer-implemented method of claim 9, wherein, when the user is not authenticated, the method further comprises presenting information to the user regarding the lack of match and requesting re-authentication of the user.

15. The computer-implemented method of claim 9, wherein the calibration signal characteristics include one or both of frequency response characteristics and impulse response characteristics.

16. The computer-implemented method of claim 9, wherein the transmitter-transducer emits the first sound signal periodically during a computing session such that the second sound signal is periodically produced in response to the first sound signal.

17. A non-transitory computer-readable storage medium storing instructions thereon, the instructions, when executed by a processor, cause the processor to implement a method comprising:
   transmitting a first sound signal through a first location on a user;
   receiving a second sound signal at a second location on the user, the second sound signal being an altered version of the first sound signal caused by transmission of sound between the first location and the second location;
   obtaining one or more calibration signals from the second signal; and
   storing calibration signal characteristics of the obtained one or more calibration signals in memory.

18. The non-transitory computer-readable storage medium of claim 17, wherein the method further comprises authenticating the user to a computing device in the event that characteristics of a new second sound signal received at the second location match the stored calibration signal characteristics.

19. The non-transitory computer-readable storage medium of claim 18, wherein the characteristics of the new second sound signal match the characteristics of the stored calibration signal characteristics when the characteristics of the second sound signal are determined to be within a predetermined margin of error relative to the stored calibration signal characteristics.

20. The non-transitory computer-readable storage medium of claim 18, wherein, in the event that characteristics of the new second sound signal do not match the characteristics of the stored calibration signal, the method further comprises disabling the computing device such that the user cannot operate the computing device.

* * * * *